United States Patent
Ye et al.

(10) Patent No.: US 6,384,852 B1
(45) Date of Patent: May 7, 2002

(54) INTELLIGENT SCREEN SAVER USING IMAGE DIFFERENCE

(75) Inventors: Yiming Ye, White Plains; Tien Huynh, Yorktown Heights; Andrew Senior, New York, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/328,969

(22) Filed: Jun. 9, 1999

(51) Int. Cl.$^7$ ................................................ G09G 5/00
(52) U.S. Cl. ............................ 345/867; 348/14; 348/15
(58) Field of Search ........................... 345/867; 348/14, 348/15

(56) References Cited

U.S. PATENT DOCUMENTS 6,108,028 A * 8/2000 Skarbo et al. ................. 348/15

* cited by examiner

*Primary Examiner*—Ba Huynh
(74) *Attorney, Agent, or Firm*—McGuireWoods LLP; Louis J. Percello, Esq.

(57) ABSTRACT

An intelligent screen saver utility that is less obtrusive than conventional screen savers is based on the absence of an operator rather than a predetermined time period for activation and detects the presence of the operator for deactivation. The screen saver is totally transparent in use to the operator and requires no touching of the keyboard or mouse movement to either prevent activation or deactivation of the screen saver. The screen saver requires a camera that can grab images. The images are grabbed and temporarily stored in the computer memory. When the difference between successively grabbed images is big enough, a person's presence is detected. When there is no big difference between successive images during a given time period, a person's absence is detected. The presence status is used to control the status of the screen saver.

17 Claims, 10 Drawing Sheets

INTELLIGENT SCREEN SAVER USING IMAGE DIFFERENCE

BACKGROUND OF THE INVENTION

1. Field of the Invention

The present invention generally relates to the control of screen savers for personal computers (PCs) and, more particularly, to an intelligent screen saver which is only switched on when the user of the computer is away from the computer for a predetermined period of time.

2. Background Description

A screen saver is a computer utility that causes the screen of the computer display to blank out or display a certain image after a predetermined amount of time passes without the keyboard being touched or the mouse being moved. Touching the keyboard or moving the mouse deactivates the screen saver. Originally, screen savers were used to prevent images from becoming permanently etched in the screen of cathode ray tube (CRT) computer monitors commonly used with desk top computers. For portable laptop computers, blanking the screen by a screen saver conserves battery power.

Currently, computers use a time indicator to control the screen saver. If a person using the computer does not touch the keyboard and/or move the mouse for a certain period of time, the screen saver turns on. This is not convenient because sometimes the person is still looking at the screen and working. In order to turn the screen saver off, the user must touch a key or move the mouse.

SUMMARY OF THE INVENTION

It is therefore an object of the present invention to provide an intelligent screen saver utility that is less obtrusive than conventional screen savers.

According to the invention, there is provided a screen saver utility based on the absence of an operator rather than a predetermined time period for activation and detects the presence of the operator for deactivation. The screen saver is totally transparent in use to the operator and requires no touching of the keyboard or mouse movement to either prevent activation or deactivation of the screen saver.

The invention requires a camera that can grab images. The images are grabbed and temporarily stored in the computer memory. When the difference between successively grabbed images is big enough, a person's presence is detected. When there is no big difference between successive images during a given time period, a person's absence is detected. The presence status is used to control the status of the screen saver.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
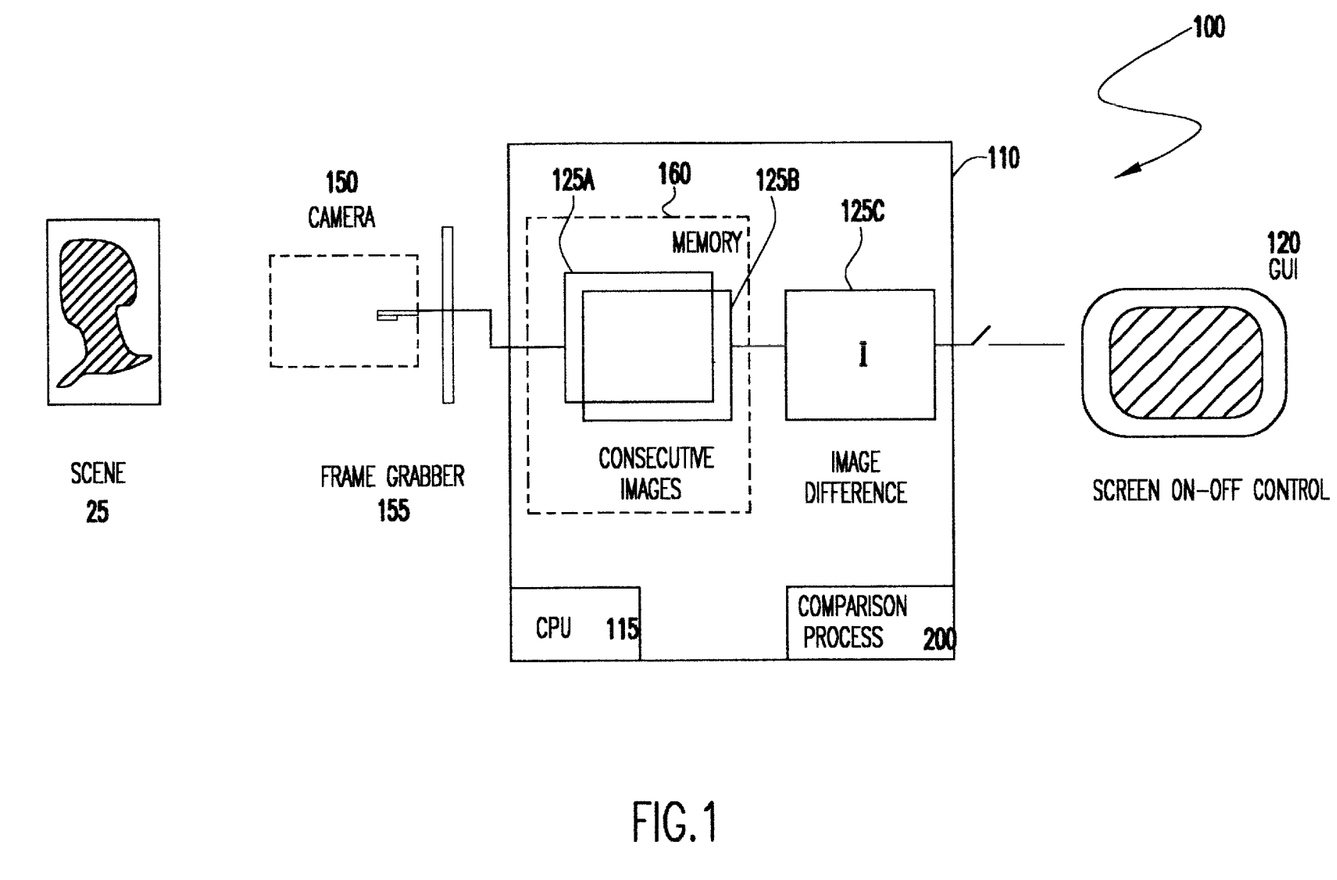
FIG. 1 is a block diagram illustrating the hardware on which the intelligent screen saver according to the invention is implemented.

Referring now to the drawings, and more particularly to FIG. 1, there is shown a block diagram of the hardware required for the implementation of the intelligent screen saver according to the invention. The invention is implemented on a Personal Computer (PC) 100, such as a desk top computer or a laptop computer. The computer has two principle components, a system unit 110 and a screen 120. The screen 120 may be, for example, a liquid crystal display (LCD) such as commonly used in laptop computers and more recently for desk top computers. Of course, in the case of desk top computers, the screen may be the more traditional cathode ray tube (CRT) display. The type of display is not critical to the practice of the invention, but the preferred embodiment of the invention contemplates the use of a screen that will support a graphic user interface (GUI).

The invention requires a camera 150 to view the scene 125 directly in front of the computer where an operator would be located. Many PCs are already equipped with cameras for such applications as teleconferencing. In the case of many laptops, cameras are now being built into the computer for use in capturing images for multimedia applications. The camera 150 can be, for example, positioned on the top of display screen housing or embedded into a corner of the LCD screen of a laptop computer.

The camera 150 is connected to a frame grabber 155, the output of which is temporarily stored in computer memory 160. Frame grabbers are known in the art and commonly used in PCs. The central processing unit (CPU) 115 runs the intelligent screen saver process according to the invention which includes the comparison process 200. The frame grabber 155 operates under the control of the CPU to store consecutive images 125A and 125B in memory 160. The images are stored in a well known "ping pong" fashion with the older of the two images being replaced by the next image grabbed by the frame grabber 155 under the control of the CPU 115. The comparison process 200 compares the two images currently in memory to generate an image difference 125C and, if there is a sufficient difference between them, determines that the operator is still present in front of the computer 100. On the other hand, if there is no substantial difference between consecutive images for a predetermined period of time, the intelligent screen saver determines that the operator is no longer present in front of the computer. When this determination is made, the CPU 115 controls the screen saver utility as schematically represented by closing the switch 170. Moreover, when in screen saver mode, the intelligent screen saver continues to run, and when the image difference 125C exceeds a predetermined threshold indicating the presence of the operator in front of the computer, the screen saver is turned off by the CPU 115 by, as schematically represented, opening switch 170.

Figure 2:
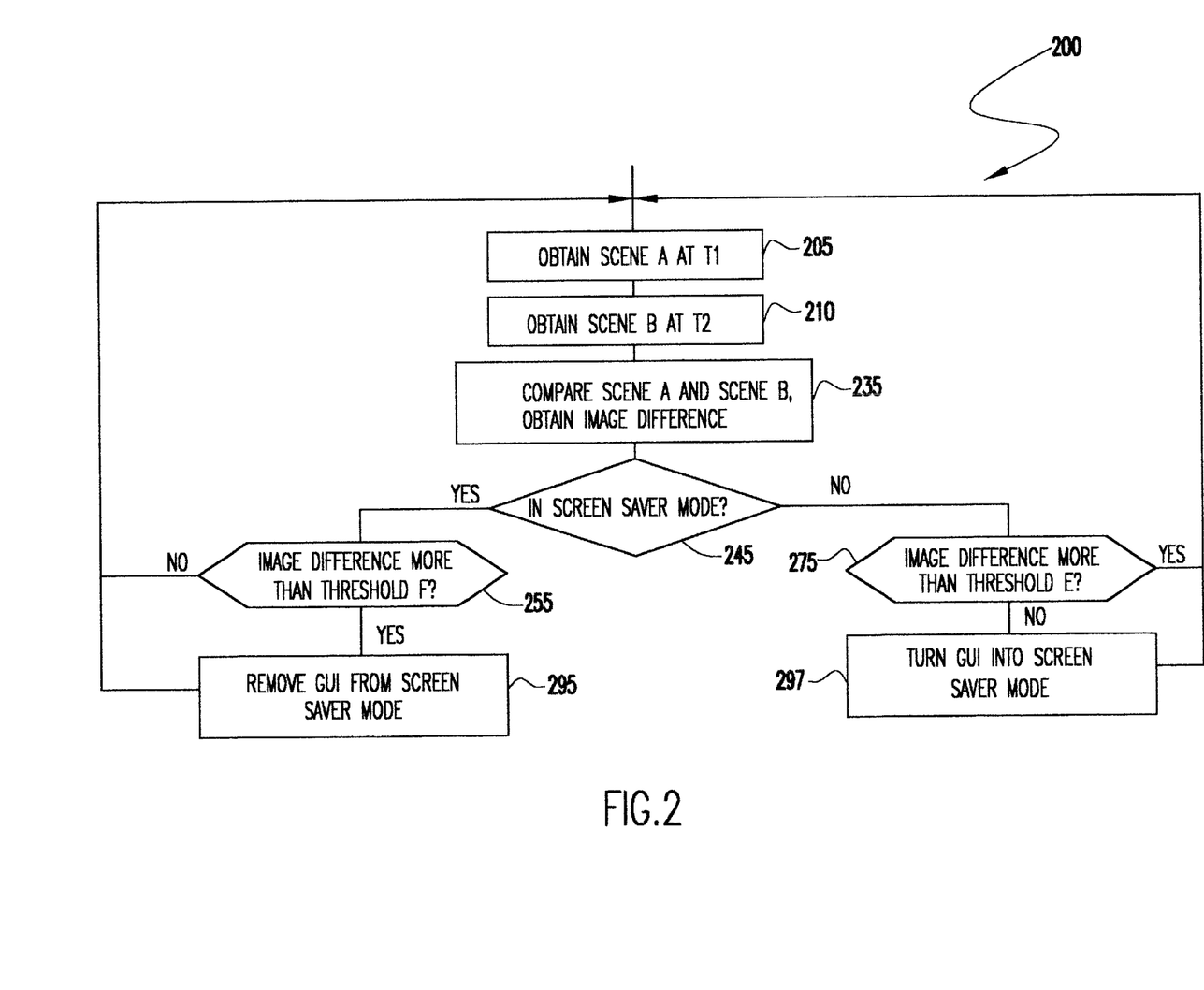
FIG. 2 is a flow diagram showing the logic of the screen saver process.

The comparison process 200 which is part of the intelligent screen saver is illustrated in more detail in FIG. 2 to which reference is now made. The process runs continuously as long as the computer is on. In function block 205, scene A is obtained at time T1, and this is followed in function block 210 by obtaining scene B at time T2. It will be understood that scene A and scene B are simply two consecutive scenes separately stored in memory. The oldest scene, A or B, is replaced by the next scene grabbed by the frame grabber 155 (FIG. 1), so that scenes A and B are alternately replaced in a well known "ping pong" fashion. The two consecutive scenes currently in memory are compared in function block 234 to generate a scene difference. A test is then made in decision block 245 to determine if the screen is currently in screen saver mode. If not, a further test is made in decision block 275 to determine if the image difference generated in function block 234 is greater than a first threshold E. If so, a decision is made that the operator is still present, and the process loops back to function block 205. If, however, the image difference is less than the threshold E, the screen saver mode is turned on in function block 297 before the process loops back to function block 205. If the screen is currently in screen saver mode as determined in decision block 275, a further test is made in decision block 255 to determine if the image difference generated in function block 245 is greater than a second threshold F. If not, a decision is made that the operator has not returned, and the process loops back to function block 205. If, on the other hand, the image difference is determined in decision block 255 to be greater than the threshold F, it is determined that the operator has returned to the computer, and the screen saver mode is turned off in function block 295 before the process loops back to function block 205.

It will be noted that there are several potential variables in the process. These are the sampling times T1 and T2, or more accurately the time period between sampling times, and the thresholds E and F. In the case of the times T1 and T2, the period of time between the two times can be varied depending on desired performance and may be a fraction of a second to several minutes in duration. The thresholds may be different or the same, again depending on desired performance. For example, the threshold F may be set higher than the threshold E so that less of a scene difference is required to deactivate the screen saver than to activate it.

Figure 3:
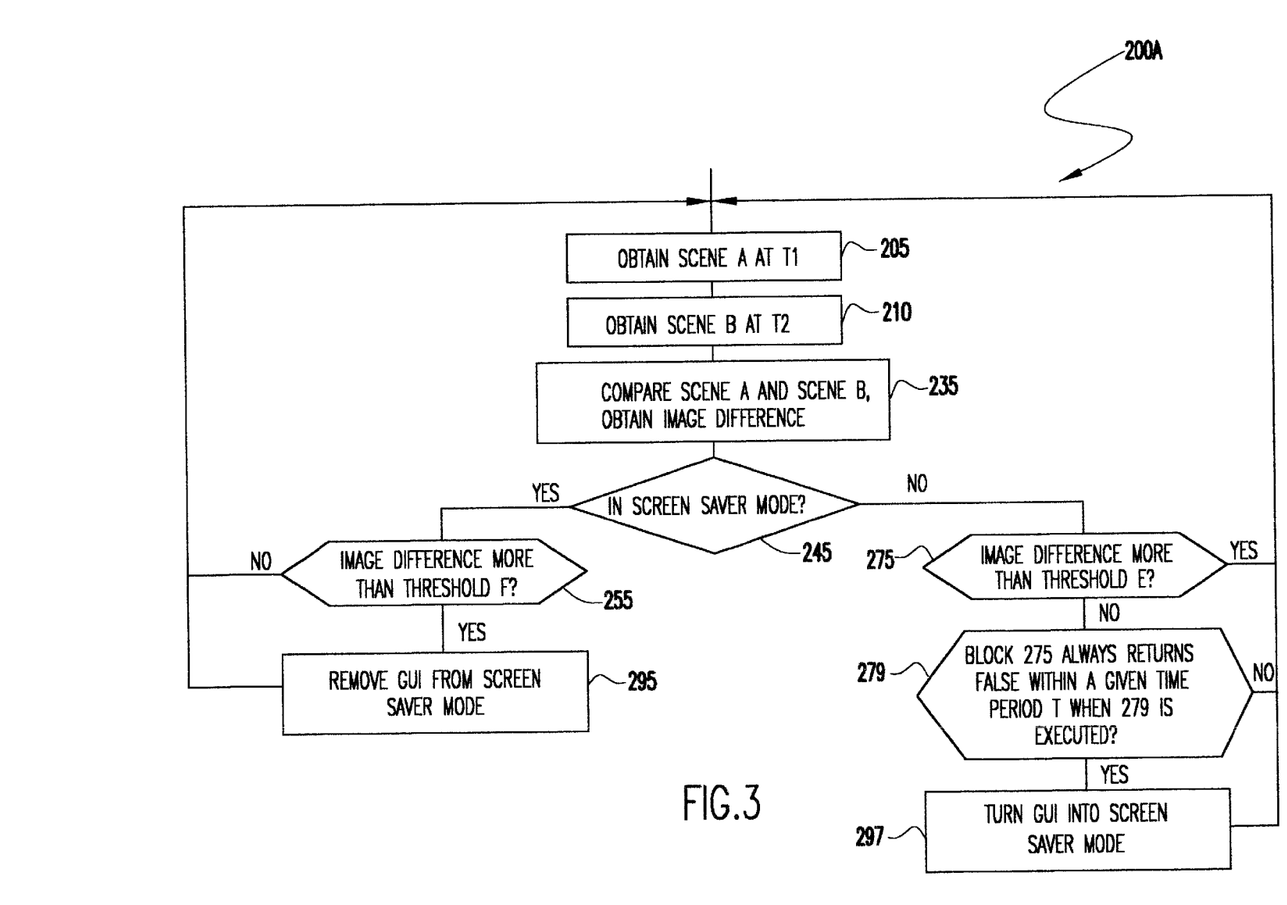
FIG. 3 is a flow diagram showing a modification of the basic logic of the screen saver process.

A modification to the basic operation is shown in FIG. 3 which adds another variable. This is the addition of decision block 279 between decision block 275 and function block 297. In decision block 279, a determination is made whether the decision in decision block 275 is always false for a predetermined period of time T. This period of time is different from the period of time between frame grabber times T1 and T2 and may in fact be a much greater time period. If the decision in decision block 275 is not always false for the predetermined period of time T, the process loops back to function block 205; otherwise, the screen saver mode is turned on in function block 297. In other words, decision block 279 provides a variable T which may be adjustable to determine how quickly the screen saver is turned on when there is no detectable image difference for a period of time.

Figure 4A:
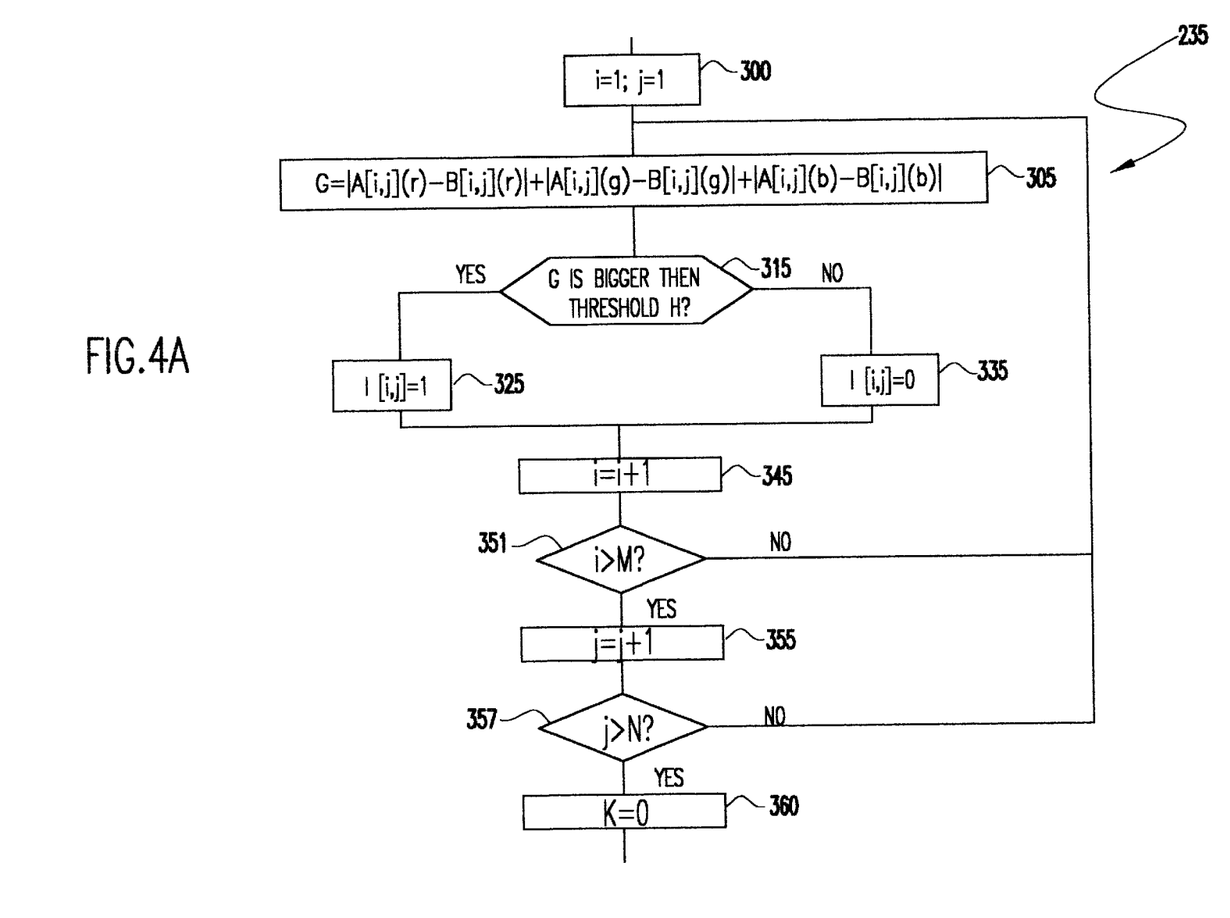
FIGS. 4a and 4b, taken together, are a flow diagram showing the logic of the scene comparison process in the screen saver process.
Figure 4B:
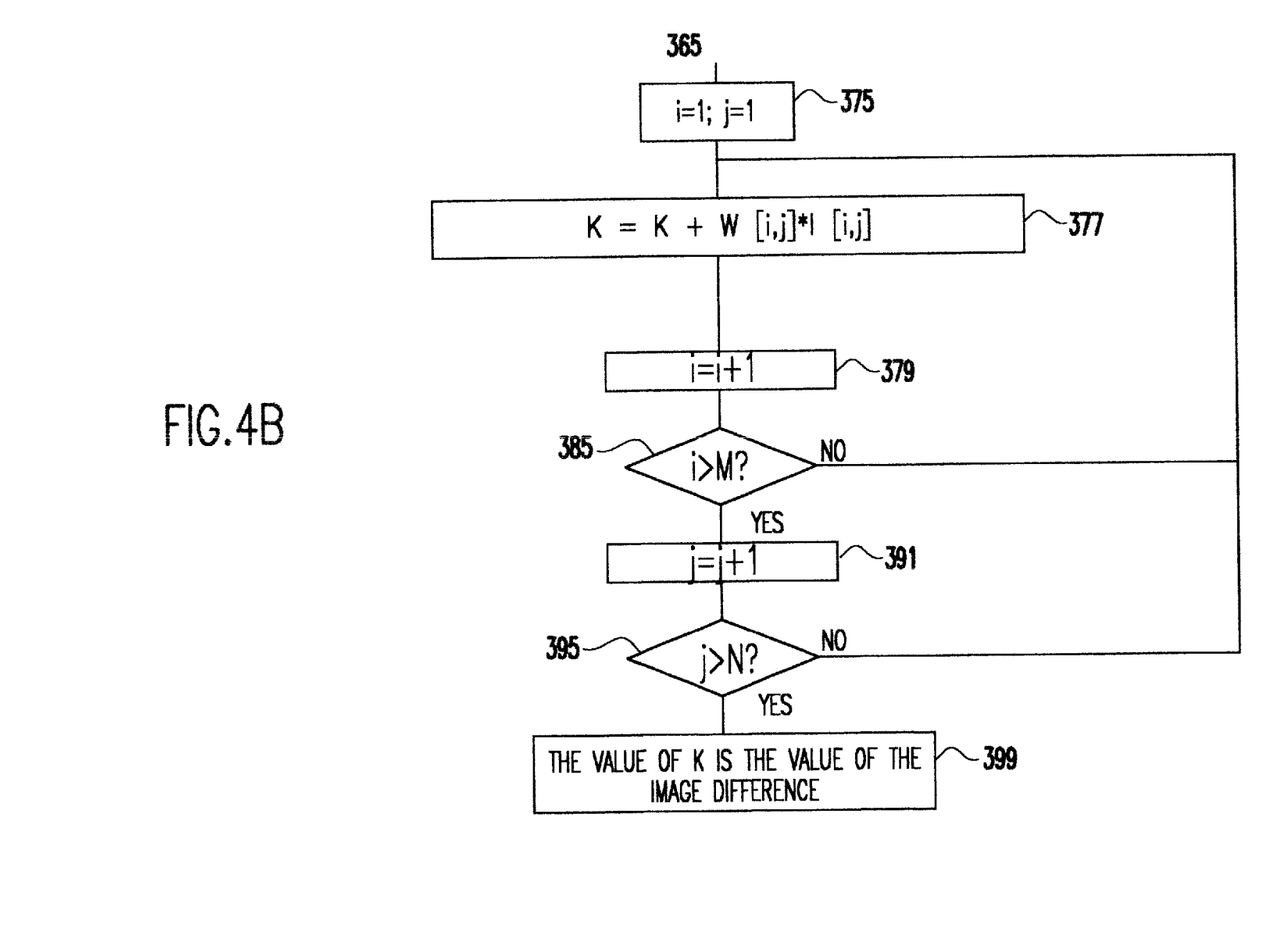

The process of function block 235 in FIGS. 2 and 3 is shown in more detail in FIGS. 4a and 4b. The process begins by initializing counters i and j to 1 in function block 300. These counters correspond to the row and column locations [i,j] of pixels in the image. A first processing loop is then entered at function block 305 where the following comparison computation is performed:

$$G=|A[i,j](r)-B[i,j](r)|+|A[i,j](g)-B[i,j](g)|+|A[i,j](b)-B[i,j](b)|,$$

where G is the pixel difference, A[i,j] and B[i,j] are respectively the locations of corresponding pixels at [i,j] of images A and B, and r, g and b are respectively the red, green and blue values of the pixels. A test is then made in decision block 315 to determine if the pixel difference G is bigger than a threshold H. If so, the image difference for that pixel, I[i,j], is set to 1 in function block 325; otherwise, it is set to 0 in function block 335. Next, pixel location i is incremented by 1 in function block 345, and a test is made to determine if i is greater than M, the height of the image. If not, the process loops back to function block 305. If so, pixel location j is incremented in function block 355, and a test is made in decision block 357 to determine if j is greater than N, the width of the image. If not, the process loops back to function block 305; otherwise, the image difference for the two images, K, is set to 0 in function block 360 and i and j are again initialized to 1 in function block 375 before the second processing loop is entered in FIG. 4b.

In the foregoing process, an image is represented by a rectangle, where M is the height of the image and N is the width of the image. For each image A, A[i,j] represents a pixel at position [i,j]. A[i,j](r), A[i,j](g) and A[i,j](b) represent the red, green and blue values, respectively, of that pixel. For two images A and B, the pixel position [i,j] has two sets of values. Function block 305 calculates the difference of the pixel [i,j] for the two images and the pixel difference as G. H is a threshold used in determining whether the pixel is occupied by the user or not. If the pixel difference G is bigger than threshold H, then we think that the difference is big enough to believe that the user occupied this pixel. Otherwise, if the pixel difference G is smaller than threshold H, then we think that the user does not occupy the pixel, and the difference is assumed to be caused by background noise.

Referring again to FIG. 4b, the following computation is performed in function block 377:

$$K=K+W[i,j]\times I[i,j],$$

where W[i,j] is the weight of pixel [i,j]. For two images A and B, their difference image is represented by I. I is a binary image in the sense that for any pixel [i,j], its intensity can only have one of two values, 0 or 1. I[i,j] is 0 if the corresponding pixel difference G is less than threshold H; I[i,j] is 1 if the corresponding pixel difference G is bigger than threshold H. The difference caused by a single pixel [i,j] is I[i,j]×W[i,j], where W[i,j] is the weight for pixel [i,j]. K is the total sum of the differences caused by all the pixels of the image, and K is the image difference for A and B. Summarizing, H is the pixel difference threshold, M,N are the height and width dimensions of the image, I is the difference image, and K is the image difference for the two images.

Continuing with the description of FIG. 4b, pixel location i is then incremented by 1 in function block 379, and test is made in decision block 385 to determine if i is greater than the image height M. If not, the process loops back to function block 305. If so, pixel location j is incremented in function block 355, and a test is made in decision block 357 to determine if j is greater than the image width N. If not, the process loops back to function block 305; otherwise, the value of K is the value of the image difference output in block 399.

Figure 5:
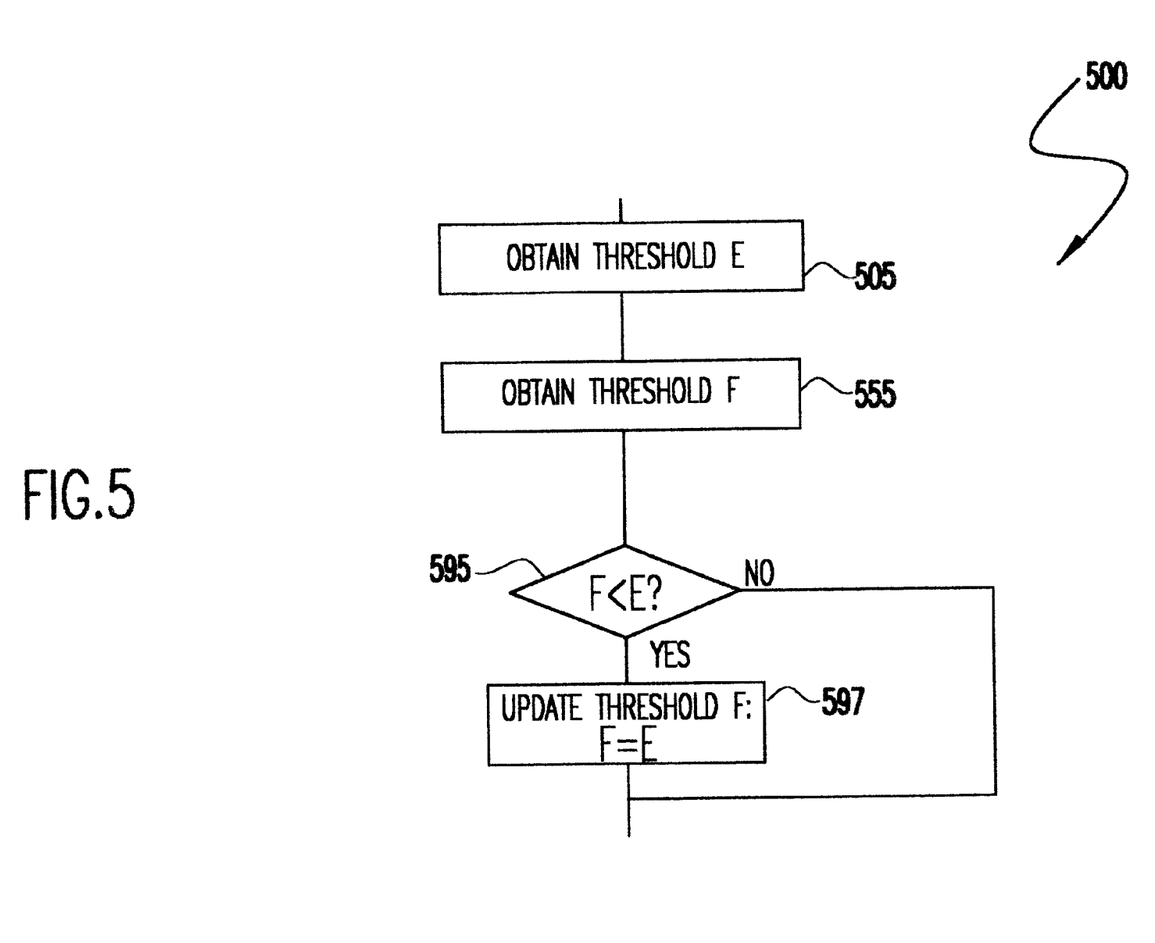
FIG. 5 is a flow diagram showing the process of obtaining the thresholds for activation and deactivation of the screen saver.

FIG. 5 is the flow diagram of the algorithm to obtain the value for the second threshold F used in decision block 255 in FIG. 2. The process first obtains threshold E in function block 505 and threshold F in function block 555. These processes are shown in more detail in FIGS. 6 and 7, respectively. A test is then made in decision block 595 to determine if threshold F is less than threshold E. If so, threshold F is updated so that F equals E in function block 597; otherwise, updating of threshold F is bypassed. The value of threshold F is thus the maximum value of threshold E and the temporary value of threshold F obtained in function block 555. In other words, Threshold F=max{threshold E, temp. threshold F}.

Figure 6:
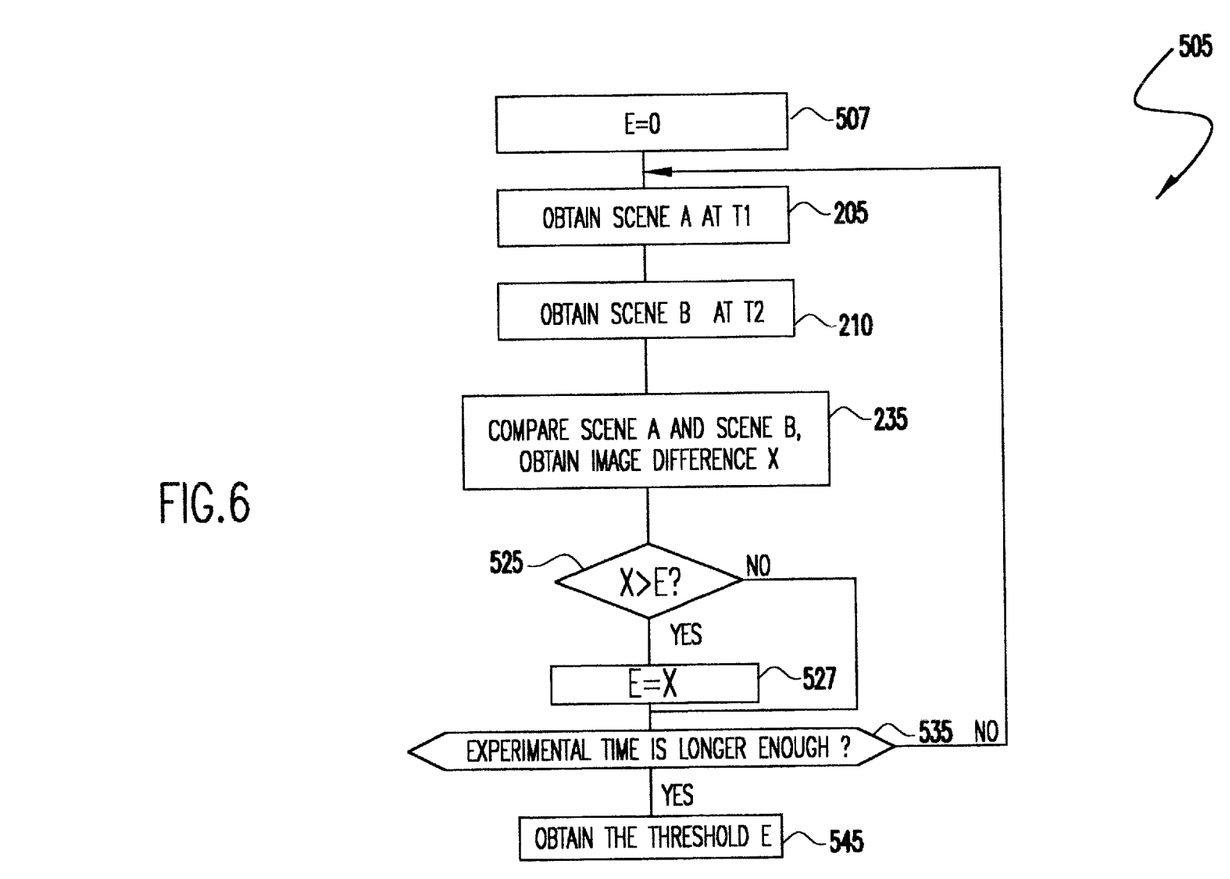
FIG. 6 is a flow diagram showing the logic of the process for obtaining the activation threshold.

Turning now to FIG. 6, there is shown the process for obtaining the threshold E by experimental process. The process begins by setting E to zero in function block 507. The scene A at time T1 is obtained in function block 205, and the scene B is obtained at time T2 in function block 210. Scene A and scene B are compared in function block 235 to obtain an image difference. (These are the same steps as in FIG. 2.) A test is then made in decision block 525 to determine if the image difference computed in function block 235 is greater than threshold E. If so, threshold E is set to the this image difference in function block 527 before the process goes to decision block 535; otherwise, the process goes directly to decision block 535 bypassing function block 527. In decision block 535, a determination is made as to whether the experimental time is sufficiently long. This is a time period that is long enough to obtain several consecutive images to represent an empirically determined significant sampling. The image differences for all of the consecutive images are determined with the maximum difference being saved. If the experimental time is not sufficiently long enough, the process loops back to function block 205; otherwise, the currently stored maximum difference is retained as the threshold E in function block 545.

Figure 7:
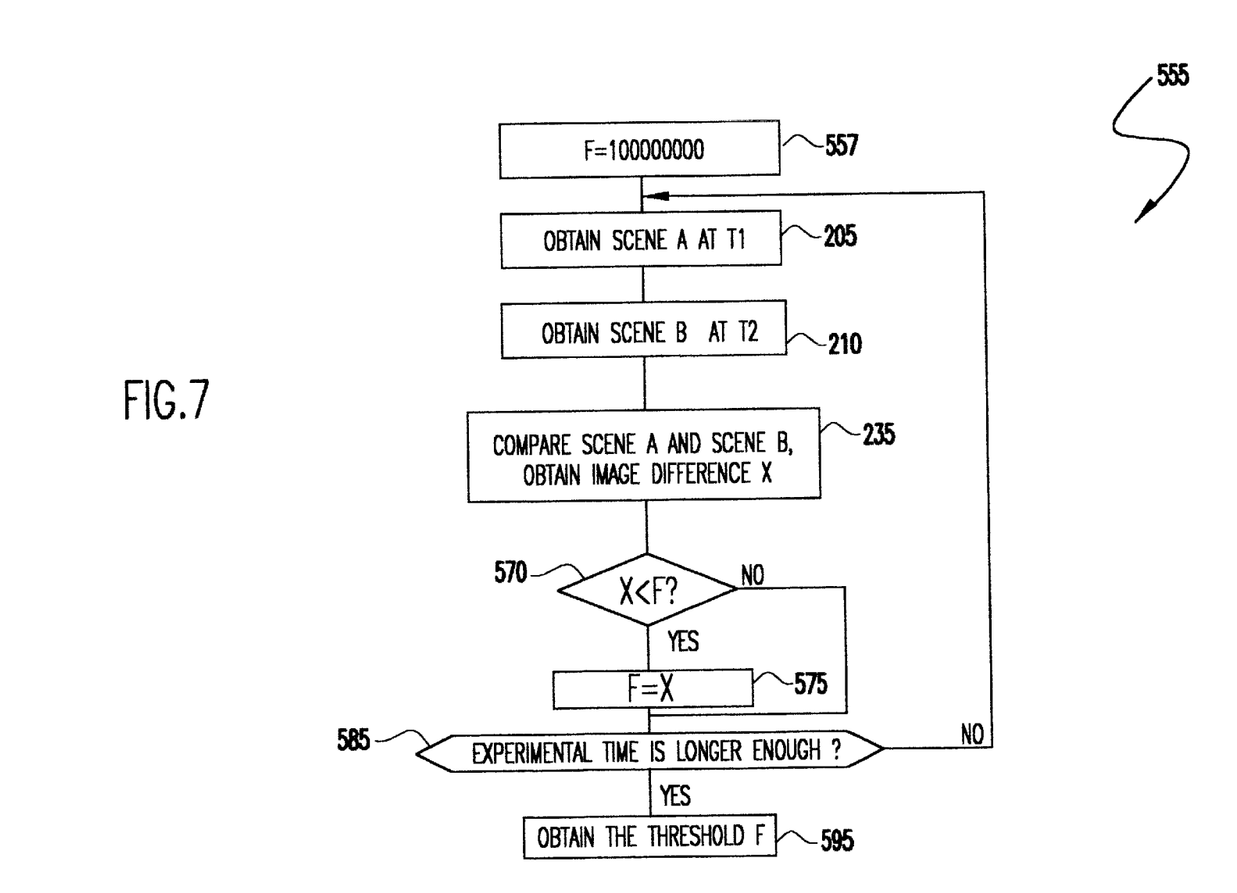
FIG. 7 is a flow diagram showing the logic of the process for obtaining the deactivation threshold.

FIG. 7 is a flow diagram showing the algorithm to obtain a temporary value for the threshold F, also by experimentation. In this case, the process starts by setting F to some large arbitrary number, here shown as one hundred million ($10^8$). As before, the scene A at tie T1 is obtained in function block 205, and the scene B is obtained at time T2 in function block 210. Scene A and scene B are compared in function block 235 to obtain an image difference. A test is then made in decision block 570 to determine if the difference computed in function block 235 is less than threshold F. If so, F is set to this computed difference in function block 575 before the process goes to decision block 585; otherwise, the process goes directly to decision block 585, bypassing function block 575. In decision block 585, a determination is made as to whether the experimental time is sufficiently long. This is a time period that is long enough to obtain several consecutive images to represent an empirically determined significant sampling. The image differences for all of the consecutive images are determined with the minimum difference being saved. If the experimental time is not sufficiently long enough, the process loops back to function block 205; otherwise, the currently stored minimum difference is retained as the threshold F in function block 595.

Figure 8:
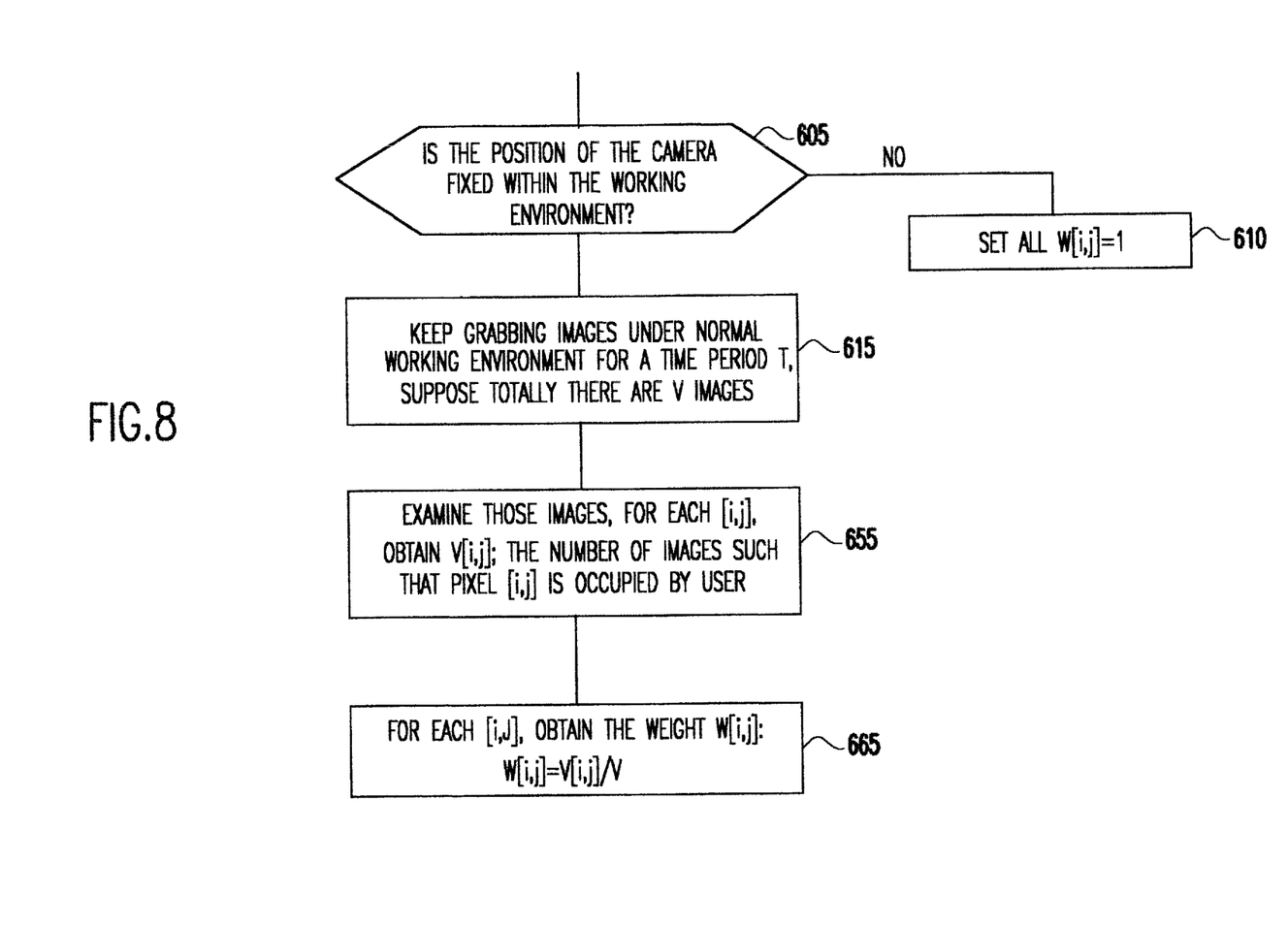
FIG. 8 is a flow diagram showing the logic of determining the weights w[i,j] used in the calculation of the image difference in FIG. 4b.

FIG. 8 is a flow diagram of the process used to determine the weights W[i,j] used in the calculation of image difference in FIG. 4b. The idea is to give those regions of the image that the user often appears high weights, and those regions that the user seldom appears low weights. The process begins in decision block 605 to determine whether the position of the camera is fixed within the working environment. This will depend on the specific hardware configuration. For example, if the camera is built into a corner of the LCD screen of a laptop computer, then the camera is not fixed because the user will bring the laptop computer to different places and thus the camera embedded into the screen is not fixed with respect to the environment. For another example, if the camera is a separate unit sitting atop the CRT display of a desk top computer, the camera may not be fixed within the working environment as it may be moved or rotated. But on the other hand, if the camera is fixed somewhere in the environment or the camera is fixed atop the CRT display and the CRT display is also fixed with respect to the environment, then the camera is fixed with respect to the environment. If the camera is not fixed within the working environment, all weights W[i,j] are set to 1 in function block 610 because we cannot experimentally determine which region the user often appears; that is, the region may change depending on the displacement and rotation of the camera.

Assuming that the camera is fixed within the working environment, a consecutive series of images are grabbed in function block 615 under the normal working environment for a predetermined time period. The number of such images is V. Each of these images is examined in function block 655. For each pixel [i,j], a value V[i,j] is obtained, which is the number of images such that pixel [i,j] is occupied by the user. Then, in function block 665, the weight W[i,j] is obtained for each pixel [i,j] as W[i,j]=V[i,j]/V.

Figure 9:
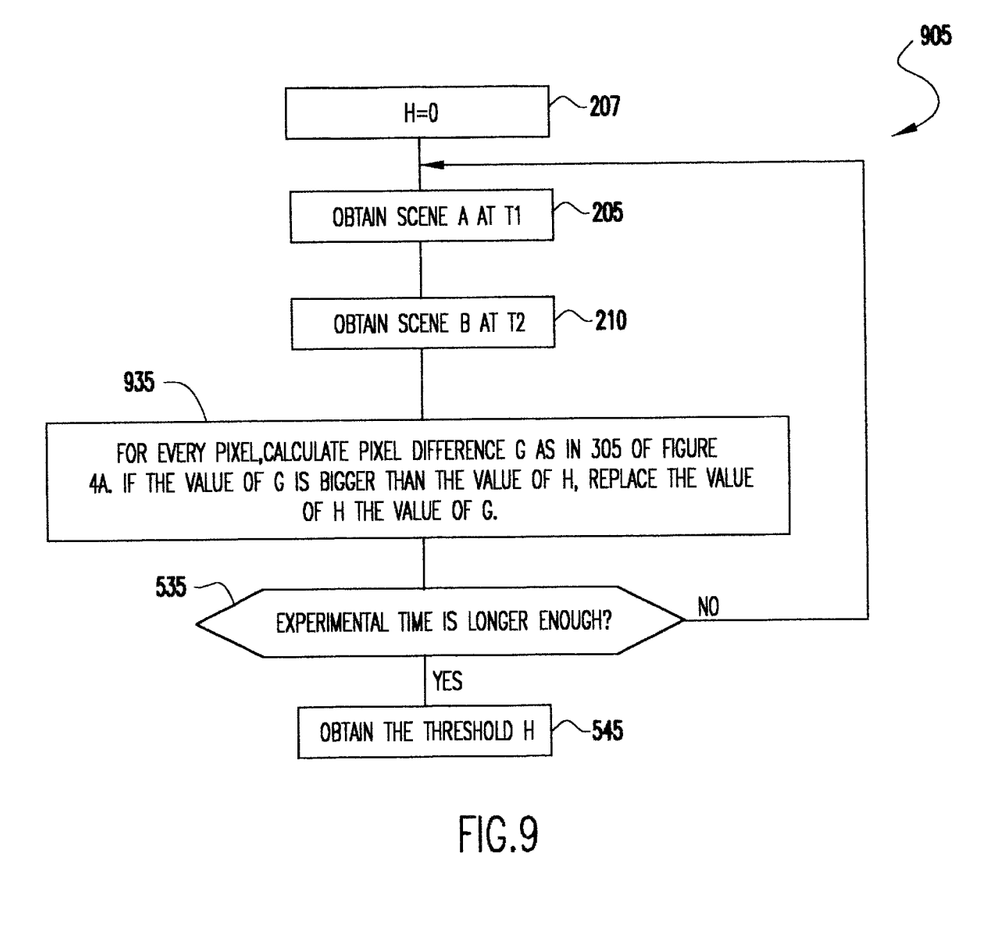
FIG. 9 is a flow diagram showing the logic of how the threshold for the pixel difference H is obtained.

FIG. 9 is the flow diagram of the algorithm to obtain the pixel difference threshold H experimentally. During these experiments, the user should not appear in the scene; in other words, only the background is within the scene. The idea is to obtain the maximum value of all the pixel differences as the value of threshold H. The purpose is to take the noise during the image capturing process into consideration. The process begins by setting the threshold H to zero in function block 907. As in FIGS. 6 and 7, the scene A at time T1 is obtained in function block 205, and the scene B is obtained at time T2 in function block 210. Scene A and scene B are compared in function block 235 to obtain an image difference. In function block 935, the pixel difference G for each pixel is calculated as in function block 305 of FIG. 4a. If the value of G is bigger than the value of H, the value of H Is replaced with the value of G. Then in decision block 535, a determination is made as to whether the experimental time is sufficiently long. This is a time period that is long enough to obtain several consecutive images to represent an empirically determined significant sampling. If the experimental time is not sufficiently long enough, the process loops back to function block 205; otherwise, the currently stored value of H is output in function block 545.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An intelligent screen saver utility process for computers having a graphical user interface comprising the steps of:
   periodically imaging a scene in proximity of the computer and temporarily storing the scene in computer memory;
   comparing successive scenes to generate an image difference;
   deciding from the image difference whether successive scenes differ by more than a first threshold; and entering a screen saver mode, if not in the screen saver mode, if successive scenes do not differ by said first threshold.

2. The intelligent screen saver utility process recited in claim 1, further comprising the steps of:

deciding from the image difference when the graphical user interface is in the screen saver mode whether successive scenes differ by more than a second threshold; and turning off the screen saver mode if successive scenes differ by said second threshold.

3. The intelligent screen saver utility process recited in claim 2, wherein the step of comparing is performed on a pixel by pixel basis.

4. The intelligent screen saver utility process recited in claim 3, wherein the pixel by pixel comparison is weighted.

5. The intelligent screen saver utility process recited in claim 4, wherein the weighting is in a scene location expected to be occupied by a user of the computer.

6. The intelligent screen saver utility process recited in claim 2, further comprising the step of experimentally determining the first and second thresholds.

7. The intelligent screen saver utility process recited in claim 6, wherein the step of experimentally determining the first and second thresholds comprises the steps of:

sampling a plurality of consecutive images; and computing image differences over a predetermined sampling time period.

8. The intelligent screen saver utility process recited in claim 2, wherein the first and second thresholds are the same.

9. A computer screen saver system comprising:

a computer including a graphical user interface;

an image capture device that periodically captures a scene image in proximity of the computer;

a memory storing consecutive scenes captured by the image capture device; and a screen saver utility that compares consecutive scenes in memory and, if the scenes do not differ by more than a first threshold, turns the graphical user interface into a screen saver mode.

10. The computer screen saver system recited in claim 9, wherein if the graphical user interface is in the screen saver mode and the scenes differ by more than a second threshold, the screen saver utility turns off the screen saver mode.

11. The computer screen saver system recited in claim 10, wherein the first and second thresholds are experimentally determined for a specific computer.

12. The computer screen saver system recited in claim 10, wherein the first and second thresholds are the same.

13. The computer screen saver system recited in claim 9, wherein screen saver utility that compares consecutive scenes on a pixel by pixel basis.

14. The computer screen saver system recited in claim 13, wherein the pixel by pixel comparison is weighted.

15. The computer screen saver system recited in claim 14, wherein the weighting is in a scene location expected to be occupied by a user of the computer.

16. A computer-readable medium having stored thereon computer-executable instructions for performing the following:

periodically imaging a scene in proximity of the computer and temporarily storing the scene in computer memory;

comparing successive scenes to generate an image difference;

deciding from the image difference whether successive scenes differ by more than a first threshold; and entering a screen saver mode, if not in the screen saver mode, if successive scenes do not differ by said first threshold.

17. The computer-readable medium recited in claim 16, said computer-executable instructions for further performing the following:

deciding from the image difference when a graphical user interface is in the screen saver mode whether successive scenes differ by more than a second threshold; and turning off the screen saver mode if successive scene differ by said second threshold.

* * * * *